(12) United States Patent
Fieglein et al.

(10) Patent No.: US 10,532,921 B2
(45) Date of Patent: Jan. 14, 2020

(54) PRINTERLESS FUEL DISPENSER

(71) Applicant: Wayne Fueling Systems LLC, Austin, TX (US)

(72) Inventors: Henry Fieglein, Cedar Park, TX (US); Scott R. Negley, III, Austin, TX (US); John Joseph Morris, Austin, TX (US); Thomas Cerovski, Cedar Park, TX (US); Steve Belt, Pflugerville, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 23 days.

(21) Appl. No.: 15/786,259

(22) Filed: Oct. 17, 2017

(65) Prior Publication Data
US 2018/0105412 A1 Apr. 19, 2018

Related U.S. Application Data

(60) Provisional application No. 62/409,108, filed on Oct. 17, 2016.

(51) Int. Cl.
*G06F 7/08* (2006.01)
*B67D 7/08* (2010.01)
(Continued)

(52) U.S. Cl.
CPC ............ *B67D 7/08* (2013.01); *B67D 7/04* (2013.01); *B67D 7/106* (2013.01); *B67D 7/145* (2013.01); *H04W 4/80* (2018.02)

(58) Field of Classification Search
CPC ............... B67D 7/04; B67D 2007/044; B67D 2007/0442; B67D 7/24; B67D 7/145;
(Continued)

(56) References Cited

U.S. PATENT DOCUMENTS

| | | | |
|---|---|---|---|
| 7,082,406 B1 * | 7/2006 | Dickson | B67D 7/145 705/16 |
| 9,424,577 B2 * | 8/2016 | Mutha | G06Q 20/325 |

(Continued)

FOREIGN PATENT DOCUMENTS

EP 1167278 A1 2/2001

*Primary Examiner* — Steven S Paik
*Assistant Examiner* — April A Taylor
(74) *Attorney, Agent, or Firm* — Mintz Levin Cohn Ferris Glovsky and Popeo, P.C.

(57) ABSTRACT

Fuel dispensers, systems and methods are provided for electronically transmitting data characterizing fueling transactions in a fueling environment, and in particular from a fuel dispenser. In an exemplary embodiment, a fuel dispenser is provided having a printer module that can perform operations that enable any one or more of replacing a printer, providing a user with a printed transaction record at a remote location, and/or provide the user with an electronic transaction record. The application of the printer module can facilitate providing a user with a printed and/or electronic transaction record, while minimizing, or eliminating, changes to standard communication protocol associated with components of a payment terminal that can deliver formatted transaction data to a typical printer. Minimizing or eliminating changes to standard communication protocol associated with providing users with transaction records can facilitate retrofitting the printer module to existing fuel dispensers, and/or simplify design considerations for new dispenser.

25 Claims, 9 Drawing Sheets

(51) Int. Cl.
*B67D 7/04* (2010.01)
*B67D 7/10* (2010.01)
*B67D 7/14* (2010.01)
*H04W 4/80* (2018.01)

(58) Field of Classification Search
CPC ........ G07F 13/00; G07F 13/025; G07F 9/023; G06Q 20/14; G06Q 20/145; G06Q 20/18; G06Q 20/209; G06Q 20/20; G06Q 20/389; G06Q 20/42; G06Q 20/425; G06Q 30/06; G06Q 30/0633; G06Q 30/0635; G06Q 50/06; G07G 1/12
See application file for complete search history.

(56) References Cited

U.S. PATENT DOCUMENTS

| | | | |
|---|---|---|---|
| 9,679,278 B2* | 6/2017 | Drummond | G06F 3/023 |
| 2003/0200108 A1 | 10/2003 | Malnoe | |
| 2008/0235105 A1 | 9/2008 | Payne et al. | |
| 2010/0177343 A1* | 7/2010 | Shapiro | G06Q 10/0637 |
| | | | 358/1.15 |
| 2013/0103190 A1* | 4/2013 | Carapelli | G06F 21/82 |
| | | | 700/237 |
| 2015/0105920 A1* | 4/2015 | Carapelli | G06Q 20/18 |
| | | | 700/283 |
| 2015/0138592 A1* | 5/2015 | Yokoyama | G07G 1/00 |
| | | | 358/1.15 |
| 2015/0368088 A1* | 12/2015 | Patel | B67D 7/04 |
| | | | 700/283 |
| 2017/0132605 A1* | 5/2017 | Gotanda | G06Q 20/209 |
| 2017/0308965 A1* | 10/2017 | Morris | B67D 7/04 |
| 2019/0139354 A1* | 5/2019 | Miller | G06Q 20/3276 |

* cited by examiner

PRINTERLESS FUEL DISPENSER

CROSS-REFERENCE TO RELATED ACTIONS

The present application claims priority to U.S. Provisional Application No. 62/409,108 filed on Oct. 17, 2016 and entitled "Printerless Fuel Dispenser" which is hereby incorporated by reference in its entirety.

FIELD

Methods and devices are provided for transmitting transaction data electronically in a fuel dispensing environment.

BACKGROUND

Prior to pay-at-the-pump technology, gasoline service stations were typically equipped with an attendant-operated terminal for manually transacting fuel purchases. This type of terminal was ordinarily situated in a central location, normally the sales office, and self-service customers were required to pay for gasoline at this location. So long as each fuel dispensing pump was "enabled," i.e., ready for pumping without attendant intervention, a customer merely had to park his car at one of the fuel islands, pump the gasoline and then walk to the central location to pay for the gasoline purchase.

However, the problem of "drive-offs" often required service station operators to avoid leaving the fuel dispensers in a normally enabled state. A "drive-off" occurred whenever a car refueling at a remote, enabled fuel dispenser drove off without paying for the gasoline. This situation led to the installation of equipment to remotely enable the fuel dispensers from the central location. It also led to requiring the customer to make a pre-payment for gasoline before the attendant enabled the fuel dispenser. However, such pre-payment could only be made at the central location, requiring the customer to park his car at one of the fuel islands and walk to the central location to tender pre-payment by cash, debit card, credit card and the like. After making the pre-payment, the customer would walk back to the fuel island and dispense the gasoline. After the fuel dispensing was done, the customer would return to the central location to complete the sales transaction by obtaining any change due, picking up a cash receipt, signing a credit card slip or performing any similar action. The procedure was time consuming and inconvenient to the customer and frequently resulted in lost sales to the service station operator.

Consequently, the option for paying for fuel purchases at the pump without the need to walk to the central location for pre-payment or post-pumping wrap-up has become increasingly popular to the motoring public. Such a point of sale system allows for payment using a customer credit card or cash or other known payment means, and can automatically enable fuel dispensers directly from a fuel island. Since current regulations require that all customers be offered the option to have a printed receipt, most fuel dispensers are equipped with an internal printer for printing a customer receipt.

One drawback to having the printer located within the dispenser or at an outdoor payment terminal is that the printer paper must be replaced on a regular basis. Since the printer compartment is often located within or near the payment terminal, certain security measures are often present and must be overcome in order to open the printer door and replace the paper. For example, in order to service a fuel dispenser, a key is often required to unlock the door, and for some dispensers a password may also need to be input into the system to disarm any alarm. One service is complete, the alarm must also be reactivated and the door locked. This can be burdensome since the printer paper often needs to be changed on a regular basis.

Moreover, one of the biggest warranty issues with in-dispenser and outdoor payment terminals is the receipt printer. The problem is that the elements have an even greater effect on the printer components than other components in the outdoor payment terminal. In addition, poor quality paper, incorrectly installed paper, and general mechanical wear cause a much higher instance of warranty repair and replacement calls for the receipt printer.

As retailers continue to transition toward the use of electronic receipts, rather than paper receipts, the need to provide paper receipts has diminished. However, many customers still require receipts for expense reports or for mileage books for tax purposes. Current fuel dispensers are not equipped to transmit payment information electronically, and there is no comprehensive way to aggregate receipts and transaction information (i.e. gallons filled, current odometer reading) for tax and business expense purposes in an automated fashion to simplify the effort required for expense submittals.

As a result, there is a need for improved methods and devices for enabling such electronic transmission of payment information in a fueling environment.

SUMMARY

Various methods and devices are provided for processing payment at a fuel dispenser. In one embodiment, a fuel dispenser is provided and includes a pump housing having at least one fuel pump disposed therein and configured to dispense fuel. The fuel dispenser can also include an electronics housing having housed therein a fuel controller operatively connected to the pump compartment for controlling the dispensing of fuel from the pump compartment. The electronics housing can also include a printer module configured to receive formatted transaction data that characterizes a user transaction, and to transmit record data that characterizes the formatted transaction data to a remote server. The electronics housing can further include a payment terminal having a control module configured to receive transaction data that characterizes a user transaction, format the transaction data to create the formatted transaction data, and to deliver the formatted transaction data to the printer module. The fuel dispenser can further include a communication module configured to facilitate electronic communication between the printer module and the remote server.

The fuel dispenser can have a variety of configurations. In one embodiment, the fuel dispenser can include an information module configured to receive user information that identifies a user and transmits the user identification information to the control module.

In another embodiment, the printer module can be configured to deliver the record data to a transaction record service on the remote server, the transaction record service being configured to create, store, and transmit a transaction record that characterizes the record data. In other aspects, the printer module can be configured to transmit the record data to the remote server using an email address provided by the user.

In other embodiments, the communication module can be configured to facilitate electronic communication between the printer module and a mobile device using near field communication. In some embodiments, the communication module can be configured to facilitate electronic communication between the printer module and a mobile device using Bluetooth communication.

In another embodiment, a device for transmitting transaction records from a fuel dispenser is provided and includes a printer module configured to receive user information characterizing an identity of a user, receive formatted transaction data characterizing a user transaction from a payment terminal of a fuel dispenser, and transmit record data characterizing the formatted transaction data and the user information to a remote server.

In one embodiment, the printer module can be configured to deliver the record data to a transaction record service on the remote server, the transaction record service being configured to create, store, and transmit a transaction record that characterizes the record data.

In another embodiment, printer module can be configured to transmit the record data to a mobile device using Bluetooth communication.

In other aspects, a method for processing a transaction at a fuel dispenser is provided and can include receiving user information that characterizes an identity of a user at a payment terminal of a fuel dispenser, receiving transaction data from the payment terminal, the transaction data characterizing a user transaction, receiving data that characterizes a desired type of record of the transaction, formatting the transaction data to create formatted transaction data, and transmitting record data based on the desired type of record of the transaction, the record data characterizing the formatted transaction data.

In one embodiment, the method can further include displaying a prompt for the user to enter data that characterizes the desired type of record of the transaction.

In another embodiment, at least one of the receiving, formatting, and transmitting is performed by at least one data processor forming part of at least one computing system.

In other aspects, the record data can be transmitted to a printer at a remote location, the printer being configured to print a receipt, thereby generating a transaction record that characterizes a user transaction.

In another embodiment, the method can further include displaying instructions to instruct a user to retrieve a transaction record at the remote location.

In another embodiment, the record data can be transmitted to a transaction records service that is configured to create, store, and transmit a transaction record that characterizes the record data.

In another embodiment, the record data can be transmitted to a mobile device using Bluetooth communication.

In yet another embodiment, a non-transitory computer program product is provided having computer readable instructions, which, when executed by at least one data processor forming part of at least one computing system, implement operations which can include receiving identification data that characterizes an identity of a user, receiving transaction data from a payment terminal of a fuel dispenser, the transaction data characterizing a user transaction, receiving data characterizing a desired type of record of the transaction, formatting the transaction data to create formatted transaction data, and transmitting record data based on the desired type of record of the transaction. The record data can characterize the formatted transaction data.

In one embodiment, the operations can include displaying a prompt for the user to enter data that characterizes the desired type of record of the transaction.

In another embodiment, at least one of the receiving, formatting, and transmitting can be performed by at least one data processor forming part of at least one computing system.

In another embodiment, the record data can be transmitted to a printer at a remote location, the printer being configured to print a receipt, thereby generating a transaction record that characterizes a user transaction.

In other aspects, the operations can further include displaying instructions to instruct a user to retrieve a transaction record at the remote location.

In yet another embodiment, the record data can be transmitted to a transaction records service that is configured to create, store, and transmit a transaction record that characterizes the record data.

In yet another embodiment, the record data can be transmitted to a mobile device using Bluetooth communication.

DETAILED DESCRIPTION

Figure 1A:
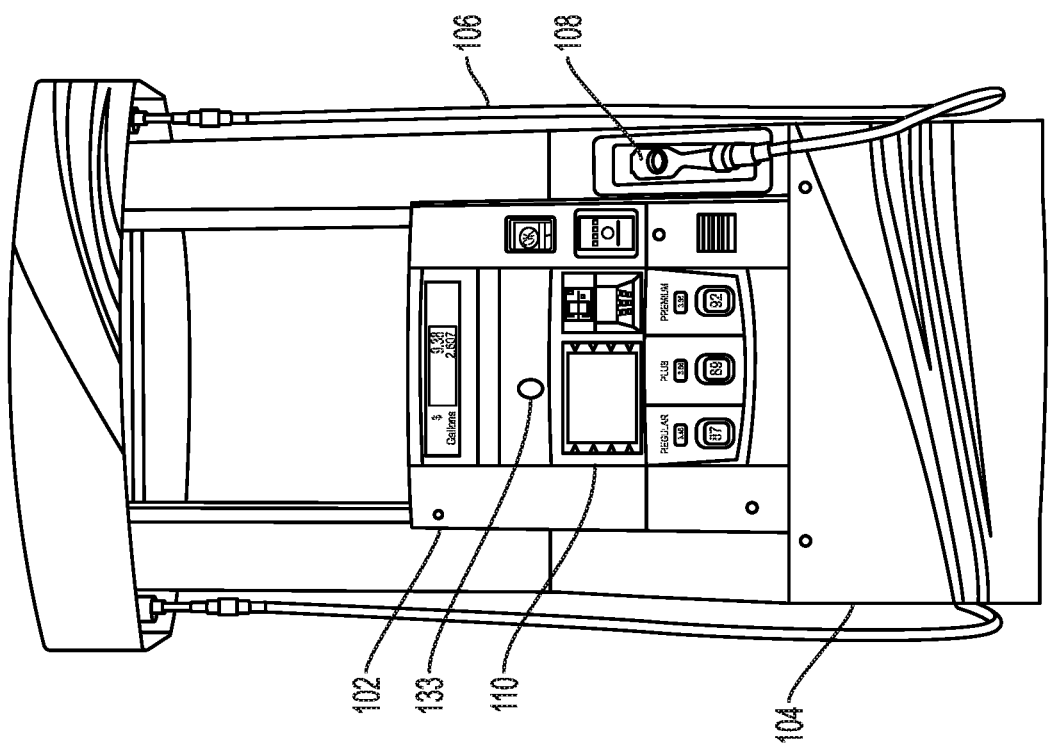
FIG. 1A is a front view of one embodiment of a fuel dispenser.

Certain exemplary embodiments will now be described to provide an overall understanding of the principles of the structure, function, manufacture, and use of the systems, devices, and methods disclosed herein. One or more examples of these embodiments are illustrated in the accompanying drawings. Those skilled in the art will understand that the systems, devices, and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention. Further, in the present disclosure, like-named components of the embodiments generally have similar features, and thus within a particular embodiment each feature of each like-named component is not necessarily fully elaborated upon.

Further, in the present disclosure, like-named components of the embodiments generally have similar features, and thus within a particular embodiment each feature of each like-named component is not necessarily fully elaborated upon.

Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

In general, various systems, devices and methods are provided for electronically transmitting data characterizing fueling transactions in a fueling environment, and in particular from a fuel dispenser. Current fuel dispensers utilize a paper printer in the dispenser to provide customers with a paper receipt, as required by current regulations. As the need for paper receipts is decreasing and consumers are move toward the use of electronic data, there is a need for the ability to transfer electronic payment information from a fuel dispenser. Since current dispensers are not currently equipped to transmit transaction data, or record data characterizing a user transaction, methods and devices are provided for enabling such transmission in a current fuel dispenser. The requirement for a paper receipt can still be met by modifying the payment terminal to instruct a customer to proceed to a location containing a printer, such as to a retail store located at the fueling site.

A person skilled in the art will appreciate that transaction data can include a variety of information, such as the price per gallon, the total number of gallons dispensed, the total sale price, an itemized list of any other items purchased (such as a car wash etc.), the date and time of the transactions, the location of the dispenser, as well as any user information such as an email address, a license plate number, mileage information obtain from the user, or any other information that may be helpful. Accordingly, the term transaction data as used herein is intended to include a variety of data that a user or master user may want to track or obtain.

A fuel dispenser can be configured to transmit electronic data using a variety of electronic transmission techniques. In certain aspects, the data can be sent using any known electronic means such as email, text messaging, smart phone notifications, and Bluetooth file transfers. Accordingly, the term "electronic transmission" as used herein is intended to any means, wired and wireless, for transmitting data electronically.

As described above, there are a number of drawbacks associated with maintaining printers located within fuel dispensers or at outdoor payment terminals. A paperless printer module is thus provided herein and can be configured to provide a user with a printed transaction record at a remote location and/or provide the user with an electronic transaction record, while minimizing, or eliminating, changes to standard communication protocols associated with components of a payment terminal. Minimizing or eliminating changes to standard communication protocols associated with providing users with transaction records can allow the paperless printer module to be retrofitted to existing fuel dispensers, and/or can simplify design considerations for new dispensers. For example, a maintenance worker can replace an existing receipt printer with the printer module. Since the paperless printer module does not need to print receipts, it can be more reliable since it can have fewer moving parts. Additionally, since the printer module does not need to be accessed regularly to replace receipt paper, cumbersome maintenance associated with replacing receipt paper can be minimized.

Figure 1B:
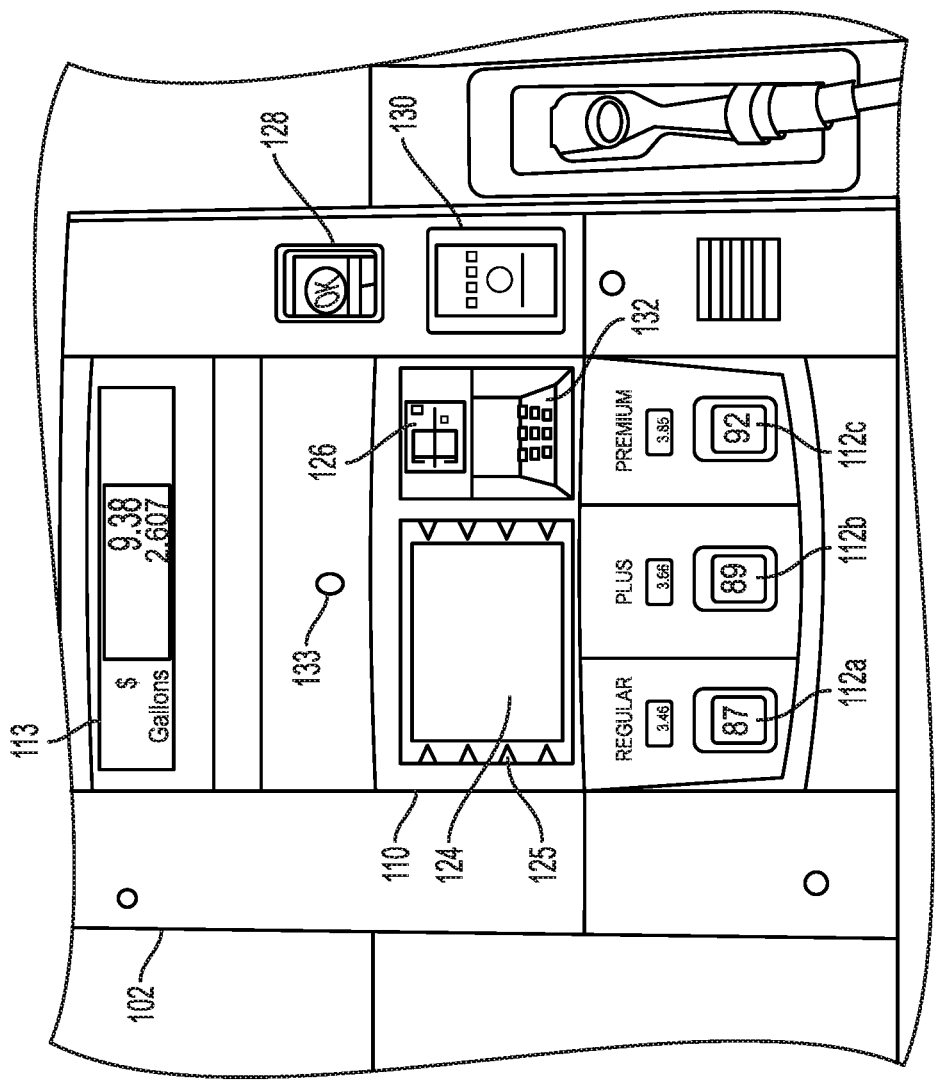
FIG. 1B is an enlarged view of an electronics housing of the fuel dispenser shown in FIG. 1A.
Figure 2:
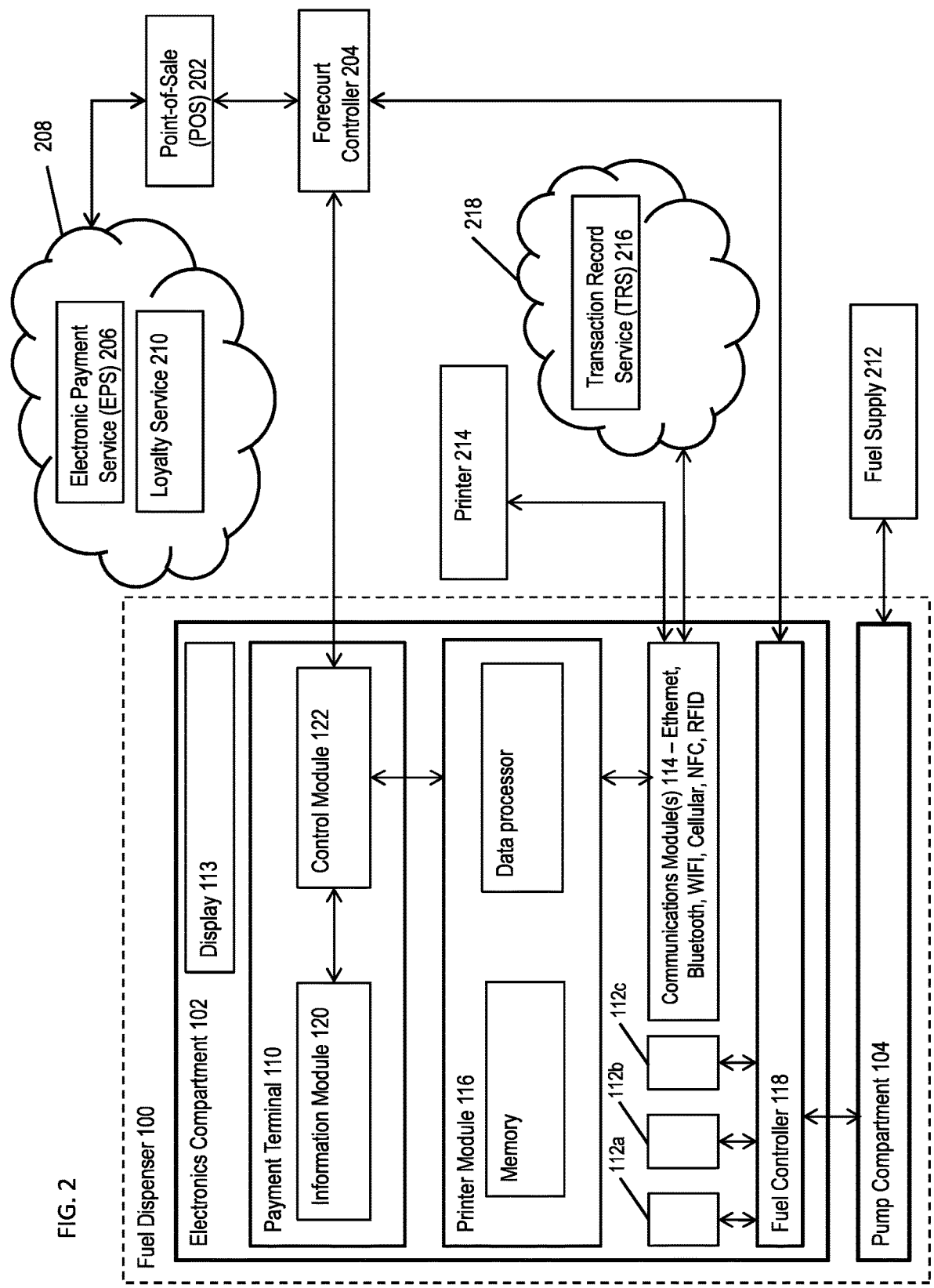
FIG. 2 is a fuel dispensing system that includes the fuel dispenser shown in FIG. 1A.

FIGS. 1A and 1B illustrate one embodiment of a fuel dispenser 100, and FIG. 2 illustrates a fuel dispensing system 200 that includes the fuel dispenser 100. In general, the fuel dispenser 100 includes an electronics compartment 102 and a pump compartment 104. The pump compartment 104 houses a pump configured to pump fuel from a fuel tank or other reservoir, as well as one or more meters that can be configured to monitor fuel flow, flow of fuel additives, and/or flow of other components of the fuel. The pump compartment 104 can also include other components to facilitate fuel dispensing, such as motors and valves, a strainer/filtering system, a vapor recovery system, and the like. The pump compartment 104 is isolated from the electronics compartment 102 within the fuel dispenser 100 to facilitate safety, security, and/or maintenance, as will be appreciated by a person skilled in the art. Fuel is thus not allowed to flow from the pump compartment 104 to the electronics compartment 102 and instead flows from the pump compartment 104 through hoses 106 to nozzles 108 for dispensing. As will be appreciated by a person skilled in the art, the nozzles 108 are each configured to dispense fuel from the fuel dispenser 100 as pumped therefrom by the pump.

The electronics compartment 102 houses electronics for facilitating fuel selection, payment for fuel, and providing a user with a transaction record (i.e. a receipt). For example, the electronics compartment 102 can include a payment terminal 110 that is configured to receive payment information and/or unique customer information, or also referred to as user information, from a user. The user information can identify the user. The payment terminal can also be configured to transmit data characterizing the information to a POS system 202 via a forecourt controller 204, and to receive data from the POS system 202 via the forecourt controller 204. The electronics compartment can further include push-to-select (PTS) buttons 112a, 112b, 112c, for selecting a desired fuel mixture, and a fuel controller 118 that is operably coupled to the PTS buttons 112a, 112b, 112c, and that is configured to control dispensing of the fuel from the pump compartment 104. In at least some implementations, the fuel controller 118 can include a data processor, memory, and storage forming part of at least one computing system. In some embodiments, the electronics compartment 102 can include a display 113 that can be operably coupled to the fuel controller 118, and that can be configured to display information regarding a status of fueling. For example, the display 113 can show a total amount, or volume, of fuel dispensed, and a corresponding total price.

The electronics compartment 102 can also include one or more communication modules 114, and a paperless printer module 116 that can be configured to facilitate delivering a printed and/or electronic transaction record to the user. In at least some implementations, the printer module 116 can include a data processor, memory, and storage forming at least part of at least one computing system. Any receiving, transmitting, calculating, and determining, that are referred to as being performed by the printer module 116 can be performed by the data processor of the printer module 116, and/or by one or more additional processors. The printer module 116 is discussed in more detail below. The communication module 114 can function to allow data to be transmitted to and from various components within the electronics compartment 102 via wired and/or wireless communication. For example, the communication module 114 can be configured to transmit and receive signals that can characterize, e.g., user information and/or a transaction record, via wired and/or wireless communications. The communication module 114 can enable wired communication via e.g., Ethernet, and can include, e.g., a transceiver for communicating via Bluetooth protocol, cellular protocol, WI-FI protocol, near field communication (NFC), and/or a radio frequency identification (RFID) protocol. Wired and/or wireless communication via the communication module 114 can be according to any of a variety of communication protocols, e.g., TCP/IP, etc., as will be appreciated by a person skilled in the art. Wireless cellular connectivity can be configured to provide wireless mobile communication, such as cellular connectivity. The wireless cellular connectivity can be 4G connectivity but other types of mobile communication standards may be used instead or in addition. Any of a variety of types of wireless cellular connectivity hardware can be used for the wireless cellular connectivity, as will be appreciated by a person skilled in the art. Wireless AC connectivity can be configured to provide wireless communication in accordance with the IEEE 802.11ac wireless networking standard. Connectivity according to another wireless networking standard is possible and may be included alternatively or in addition. The wireless AC connectivity may facilitate wireless mesh network communication, as will be appreciated by a person skilled in the art. Any of a variety of types of wireless AC connectivity hardware can be used for the wireless AC connectivity, as will be appreciated by a person skilled in the art. A person skilled in the art will also appreciate that the communication module 114 need not be located within the electronics compartment 102, and in other embodiments can be mounted at other locations on the dispenser.

The payment terminal 110 can include an information module 120 that, at least in some implementations, can include a data processor, memory, and storage, forming part of at least one computing system. The information module 120 can be configured to receive input such as, e.g., user information and/or payment information, and deliver the information to a control module 122 that, at least some implementations, can include a data processor, memory, and storage, forming part of at least one computing system. For example, the information module 120 can include a display 124 that can be operably coupled to the control module 122 which can be used to control, dynamically rearrange, and/or update a graphical user interface (GUI) rendered on the display 124. The display 124 can be configured to show information (e.g., media content, fuel selection options, payment information, user information, etc.) in the form of one or more graphical elements, or graphical objects. The display 124 can also be configured to show promotional information such as offers for car washes, and sales on goods that can be sold within a store. In some embodiments, the display 124 can be, or can include, a touchscreen, and can receive input (e.g., user information, payment information, etc.) thereon. In other embodiments, the user can select various options shown on the display 124 using buttons 125 positioned adjacent to the display 124. As an example, the display 124 can prompt the user with various options and information such as common fuel costs, fuel additives that are available, available payment methods, and the like. The control module 122 is discussed in more detail below.

To facilitate payment, the information module 120 can include a card reader such as a magnetic strip card reader 126, a barcode and/or QR code scanner 128, and/or a NFC reader 130 for receiving payment information and/or user information. As an example, the scanner 128 can scan a loyalty program card and receive a loyalty identifier that corresponds to the user. In some embodiments, the information module 120 can include an image sensor for automatically acquiring images of facial features of the user, vehicle features (e.g., vehicle make, model, color, etc.), license plate number, non-facial body features, and the like, which can be used as user information to identify the user. The information module 120 can also include a microphone 133 to allow a user to input data using voice commands. In some embodiments, the information module 120 can also include an input module 132 (e.g., a keypad) that can allow the user to input alphanumeric information, symbols, confirmation commands, and/or cancellation commands.

The user information can include user preferences (e.g., default setting for receiving a transaction record), contact information (e.g., an email address, phone number, etc.), and/or information regarding a device that will consume the fuel, such as vehicle make, model, mileage, or any other information that may be helpful. As another example, the user preferences can include instructions for the payment terminal 110 to send a transaction record that characterizes a user transaction immediately upon receipt to a user's email address or send it via text message to a mobile device. In other embodiments, the user preferences can include instructions to store the transaction records and send all transaction records associated with that user on a regular basis, such as weekly, monthly, yearly, etc.

The control module 122 can receive payment information and/or user information from the information module 120, and can provide data characterizing payment information and/or user information to the forecourt controller 204 via, e.g., a serial cable. The forecourt controller 204 can deliver the payment information and/or user information, to the POS system 202. The POS system 202 can be connected to the internet and can be configured to communicate with a network cloud 208, and can deliver the payment information to an electronic payment service (EPS) 206, which can be located on a server of the network cloud 208, for authentication and pre-authorization. The POS system 202 can also deliver user information to a loyalty service 210. As an example, a loyalty identifier can be delivered to the loyalty service 210, which can use the loyalty identifier to determine or obtain user information such as, e.g., contact information, user preferences, and/or a pre-set payment method. Accordingly, in some embodiments, a pre-determined payment method can be determined based on user information.

Once the payment information has been authenticated and pre-authorized, the POS system 202 can deliver a signal to the fuel controller 118 via the forecourt controller 204 to activate the fuel controller 118. The forecourt controller 204 can also deliver pricing information characterizing a unit price, or unit value, of each of the available fuel grades and/or additives to the fuel controller 118. Additionally, the POS system 202 can deliver a signal to the control module 122 via the forecourt controller 204 to inform the user to begin fueling. As an example, the control module 122 can receive the signal from the forecourt controller 204 and can provide a signal to the display 124 to update the GUI rendered on the display 124 to prompt the user to begin fueling. The user can select a desire fuel grade using the PTS buttons 112a, 112b, 112c, which delivers a signal characterizing the desired fuel grade to the fuel controller 118. The fuel controller 118 can activate a pump corresponding to a desired fuel grade, such that the user can begin fueling. For example, the user can remove the nozzle 108 from the dispenser and can depress a lever on the nozzle 108 to begin dispensing fuel.

As shown in FIG. 2, the pump compartment 104 can be coupled to a fuel supply 212 which can store the various fuel grades and additives. Each component can be stored in a separate storage tank for delivery to the dispenser. One or more pumps within the pump compartment 104 can draw fuel and/or additives from the fuel supply 212. During fueling, the meters within the pump compartment 104 can measure the amount of fuel that has been dispensed, and can provide data to fuel controller 118 characterizing said amount. The fuel controller 118 can use the data characterizing the total amount of fuel dispensed along with the pricing information corresponding to the selected fuel grade and/or additives to calculate a total price of the dispensed fuel and/or additives. The fuel controller 118 can deliver data characterizing the volume of fuel and/or additives dispensed, and the corresponding total price, or total value, to the display 113 to show the volume and total price of dispensed fuel to the user.

Once the user is finished delivering fuel, a signal can be transmitted to the POS system 202 to indicate that fueling is complete. For example, the user can place the nozzle 108 back into a nozzle boot on the fuel dispenser 100 which can deliver a termination command to the fuel controller 118. As another example moving a lever or switch or pressing a button can indicate that fueling is complete and can deliver the termination command to the fuel controller 118. The fuel controller 119 can deliver fueling data characterizing a total amount of fuel and/or additives dispensed, and a corresponding total price, to the POS system 202 via the forecourt controller 204. The POS system 202 can transmit the fueling data and the payment information to the EPS 206 to finalize payment. The POS system 202 can deliver a signal to the control module 122 to indicate that the payment has been finalized. The POS system 202 can also deliver transaction data, which can include fueling data, some payment information (e.g., payment method, last four digits of credit card number, etc.), user information, user preferences, to the control module 122 of the payment terminal 110. The transaction data can also include a variety of other information such as the unit price of the fuel (price per gallon), an itemized list of any other items purchased (such as a car wash etc.), the date and time of the transactions, taxes added to the total fuel price, the location of the dispenser, and any other desirable information related to the transaction.

The payment terminal 110 can prompt the user to accept or decline a receipt, or transaction record. For example, the control module 122 can deliver a signal to the display 124 to update the GUI rendered on the display to prompt the user to accept or decline a receipt. The user can input to accept or decline the receipt using, e.g., the buttons 125 adjacent to the display 124, the input module 132, and/or the display 124 itself. In some embodiments, the payment terminal 110 can prompt the user to accept or decline the transaction record prior receiving the transaction data from the POS system 202. In other embodiments, the payment terminal 110 can prompt the user to accept or decline the transaction record after the transaction data is received from the POS system 202. If the user accepts the transaction record, the control module 122 can format the transaction data to create formatted transaction data, and deliver formatted transaction data to the printer module 116, which is configured to facilitate delivering a transaction record to the user. The formatted transaction data that is delivered to the printer module 116 can be in the same format as transaction data that would be delivered to a typical printer of a fuel dispenser or a payment terminal.

The printer module 116 can receive the formatted transaction data and can deliver a command to the control module 122 to prompt the user to select whether they would like a printed transaction record or an electronic transaction record. For example, the control module 122 can deliver a signal to the display 124 to update the GUI to prompt the user to select an option to receive a printed transaction record or an electronic transaction record. The control module 122 can receive the user input characterizing the desired type of transaction record from the information module 120. The control module 122 can deliver data characterizing the user input to the printer module 116 to provide instructions for delivering the transaction record.

As shown in FIG. 2, the printer module 116 can be operably coupled to the communication module 114. The communication module 114 can allow the printer module 116 to deliver record data characterizing formatted transaction data to a printer 214, a transaction records service (TRS) 216, and/or a mobile device such as a smart phone, tablet, laptop, and the like, that is in electronic communication with the printer module 116 via the communication module 114.

The printer 214 can be in a remote location such as within a retail store on site, or a station area at the site where the fuel dispenser 100 is located. The TRS 216 can be located on a server of a network cloud 218. Accordingly, if the user desires a printed transaction record, the printer module 116 can deliver the record data to the printer 214 via the communication module 114 to print the record data, thereby creating the transaction record. The printer module 116 can also deliver a command to the control module 122 to instruct the user (e.g., via the display 124) to retrieve the transaction record from the printer 214, or from another location. Although the network clouds 208, 218 are shown to be independent, the network clouds 208, 218 can be the same network cloud, or they can be in electronic communication with each other.

Although the communication module 114 is shown to be located within the payment terminal 110, the communication module 114 can be located elsewhere on, within, or in the vicinity of, the fuel dispenser 100. For example, the communication module 114 can be mounted on top of the fuel dispenser, which can facilitate retrofitting the communication module 114 to existing fuel dispensers and/or facilitate repair, upgrade, or other maintenance of the communication module 114, as described in U.S. patent application Ser. No. 15/182,201 filed on Jun. 14, 2016 and entitled "Methods and Devices for Fuel Dispenser Electronic Communication," which is hereby incorporated by reference in its entirety.

If the user desires an electronic transaction record, the printer module 116 can process and analyze the formatted transaction data to verify that appropriate contact information (e.g., an email address and/or a phone number) is included. If the formatted transaction data does not include appropriate user information such as, e.g., contact information, the printer module 116 can deliver a command to the control module 122 to prompt the user to input contact information. For example, the control module 122 can deliver a signal to the display 124 to update the GUI to prompt the user input contact information. The user can enter contact information using various components of the information module 120 (e.g., the input module 132, the buttons 125, the display 124, the NFC reader 130, and/or the scanner 128). The contact information can be delivered to the control module 122, which can subsequently deliver the contact information to the printer module 116. The printer module 116 can deliver record data characterizing the formatted transaction data, including the contact information, to the TRS 216. In some embodiments, the printer module 116 can be configured to deliver the record data to a user via text message, thereby creating the transaction record. In other embodiments, the printer module 116 can create a portable document format (PDF) file that includes data characterizing the record data, thereby generating the transaction record. The printer module 116 can then deliver the transaction record to the user directly via text message, email, NFC, Bluetooth, etc., using the communication module 114.

The TRS 216 can be maintained on a server in the network cloud 218, and it can be configured to receive record data, generate and store transaction record, and deliver electronic transaction records to users. The TRS 216 can also be configured to receive record data from multiple fuel dispensers at multiple locations, as well as to obtain and store user information. For example, a user can register with the TRS 216 to create a user account, and the user account can include certain user information such as a phone number, an email address, loyalty program information (e.g., a loyalty identifier), user preferences, etc. for that user. As an example, user preferences can include information regarding how a transaction record should be delivered to the user. As another example, the user preferences can set a default condition for the TRS 216 to store transaction records, but not deliver them to the user. The TRS 216 can utilize this user information to determine how to handle data received from a fuel dispenser (e.g., data characterizing the formatted transaction data send from printer module 116). In other aspects, a master user can register with the TRS 216 to create a master user account containing similar information. The TRS 216 can associate one or more individual users with a master user. The TRS 216 can be configured to automatically associate any user, including unregistered users, with a master user, for example based on the domain name of both the user's email address and the master user's email address, a license plate number, etc.

As described above, the printer module 116 can be configured to receive formatted transaction data that is in the same format as transaction data that would otherwise be delivered to a typical printer of a fuel dispenser or a payment terminal. Therefore, the application of the printer module 116 can facilitate providing a user with a printed and/or electronic transaction record, while minimizing, or eliminating, changes to standard communication protocol associated with components of the payment terminal 110 (e.g., the control module 122 or other components) that can deliver formatted transaction data to a typical printer). Minimizing or eliminating changes to standard communication protocol associated with providing users with transaction records can facilitate retrofitting the printer module 116 to existing fuel dispensers, and/or simplify design considerations for new dispenser. Since the printer module 116 does not need to print receipts, it can be more reliable since it can have fewer moving parts. Additionally, since the printer module 116 does not need to be accessed regularly to replace receipt paper, cumbersome maintenance associated replacing receipt paper can be minimized. The transaction records that are stored by the TRS 216 can facilitate expense tracking. For example, users can access the stored transaction records remotely to retrieve the transaction records for tax purposes or for submission with an expense report to a business.

Although the fuel dispenser 100 provided in FIG. 1 includes an in-dispenser payment terminal, an outside payment terminal (ODP) could be used. In that case, the printer module 116 can be located at the ODP. The ODP serves the same function as the iDPT, except it is not physically integral with the fuel dispenser, but connected electronically via a wired or wireless connection. Therefore, the term "payment terminal" is be used to refer both an iDPT and an ODP.

Figure 3A:
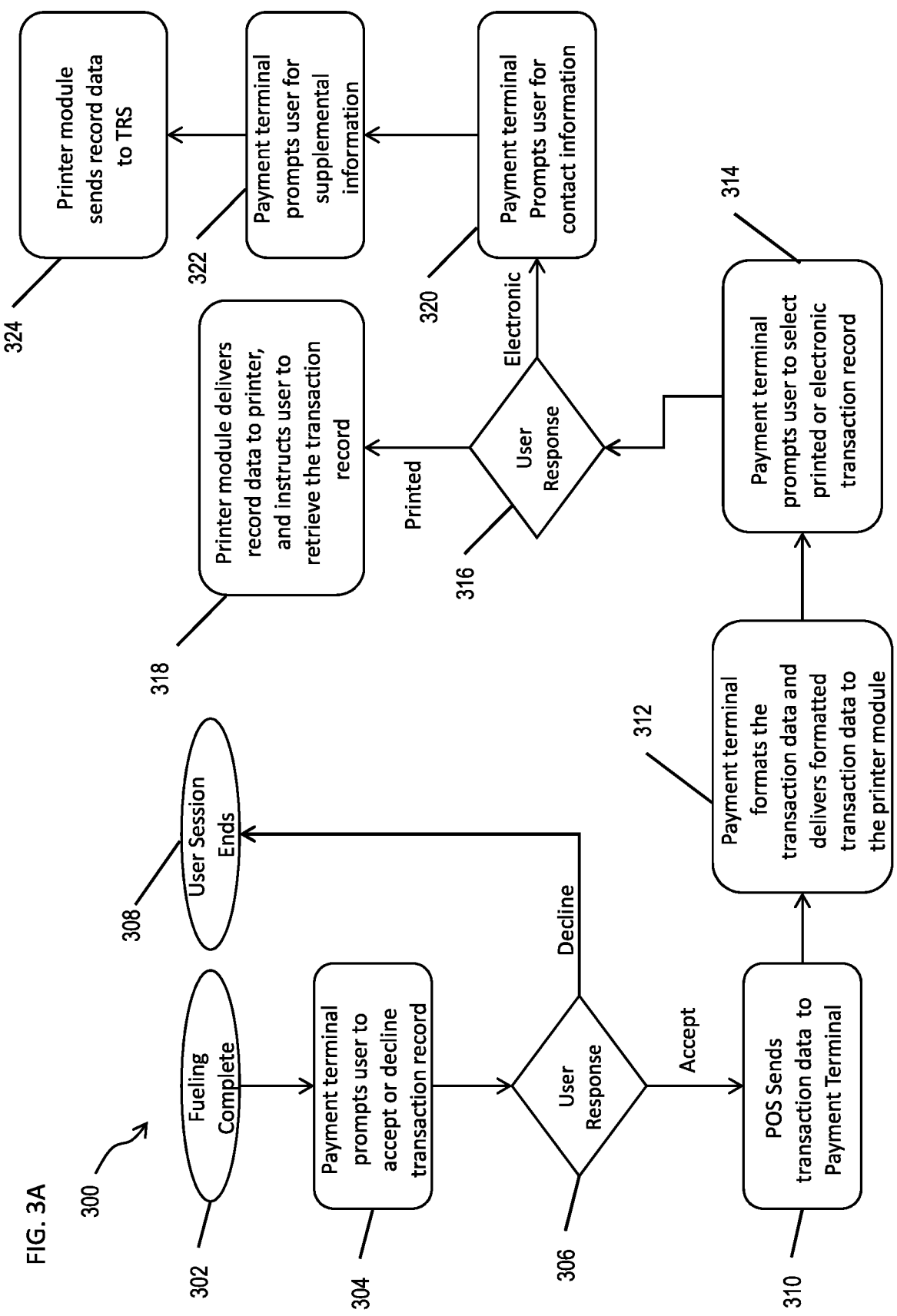
FIG. 3A is a flow diagram illustrating a portion of a process for providing a user with a transaction record.
Figure 3B:
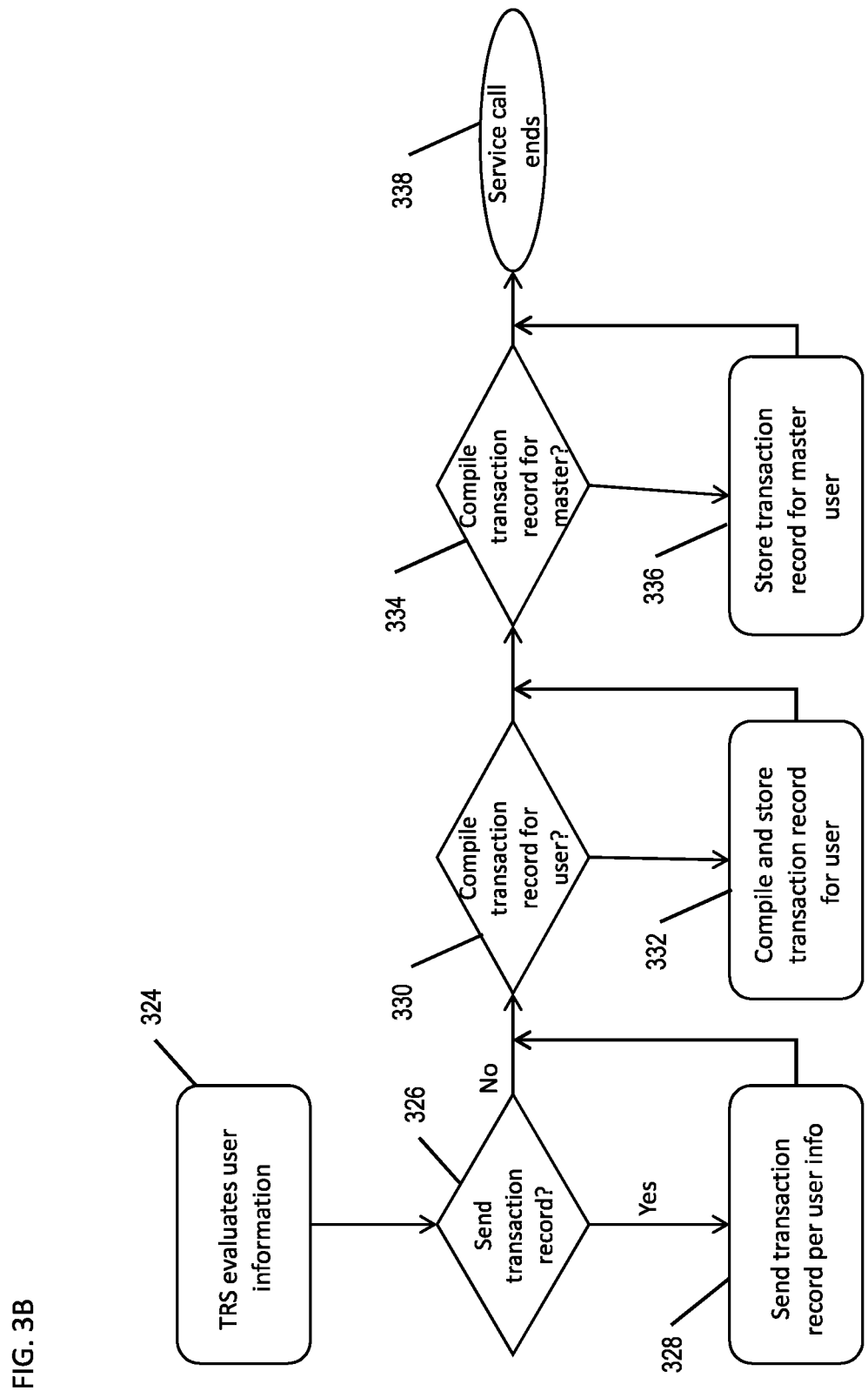
FIG. 3B is a flow diagram illustrating another portion of the process shown in FIG. 3A for providing a user with a transaction record.

FIGS. 3A-3B illustrate an exemplary process 300 for delivering a transaction record once fueling is complete. At step 302, the POS system 202 can deliver a signal to the payment terminal 110 to indicate that fueling is complete. At step 304 the payment terminal 110 can prompt the user (e.g., via the display 124) to accept or decline a transaction record. The user can then choose to accept or decline the transaction record, as shown in step 306. If the user declined, the user session ends, as shown in step 308. If the user has accepted the transaction record, the POS system 202 can send the transaction data to the payment terminal 110, as shown in step 310. At step 312 the payment terminal can format the transaction data and deliver the formatted transaction data to the printer module. At step 314, the payment terminal 110 can prompt the user to select an option to receive printed transaction record or an option to receive electronic transaction record. At step 316, the user can input data to select a printed transaction record and/or an electronic transaction record.

If the user selects a printed transaction record, the printer module 116 can deliver record data characterizing the formatted transaction data to the printer 214 to create the printed transaction record, as shown in step 318. The payment terminal 110 can also instruct the user to retrieve the printed transaction record at the location of the printer 214. As shown in step 320, if the user selects an electronic transaction record, the payment terminal 110 can prompt the user to input user information (e.g., contact information such as an email address and/or telephone number) such that the electronic transaction record can be delivered to the user. At step 322, the payment terminal 110 can prompt the user for supplemental information such as, e.g., an odometer reading, vehicle make, vehicle model, color, a license plate number, etc. Data characterizing the supplemental information and the user information can be delivered to the printer module 116 to be included with the formatted transaction data. As shown in step 324, the printer module 116 can send record data characterizing the formatted transaction data. In some embodiments, the record data can be transmitted immediately to the user. For example, the record data can be delivered to the user via text message to create the transaction record. As another example, the record data can be delivered to a mobile device of the user via NFC or Bluetooth communication. The printer module 116 can also initiate a service call to the TRS 216 to deliver the record data to the TRS 216, which can generate transaction records, store transaction records, and deliver the transaction records to the user.

The steps described above with regard to the process 300 shown in FIG. 3 can occur in various orders. For example, the POS system 202 can deliver transaction data to the payment terminal 110 at step 302 along with the signal that indicates that fueling is complete. In some embodiments, the printer module 116 can deliver record data to the TRS 216 even if the user does not desire transaction record to be delivered. For example, the TRS 216 can store a transaction record that the user, or a master user, can access at a later date. As another example, the TRS 216 can generate a transaction record and deliver the transaction record to a master user. The payment terminal 110 can also provide the user with both a printed transaction record as well as an electronic transaction record. As another example, the payment terminal 110 can prompt the user to accept or decline a transaction record at any point prior do fueling, during fueling or after fueling.

At step 324, if a service call is initiated, the TRS 216 can evaluate user information (e.g., user preferences) to determine appropriate actions for delivery of the transaction record. At step 326, the TRS 216 can determine whether the user wants a transaction record to be delivered. If the user has accepted delivery of a transaction record, the TRS 216 can deliver the transaction record using the contact information provided by the user, as shown in step 328. For example, the TRS 216 can create a PDF file that includes data characterizing the formatted transaction data, thereby creating the transaction record. In some cases, the TRS 216 can deliver the transaction record to the user via email. As another example, the TRS 216 can deliver a transaction record via text message. The TRS 216 can then determine if a transaction record should be compiled to store the transaction record for the user, as shown at step 330. If the user desires that a transaction record be stored, then the TRS 216 can compile a store the transaction record, as shown at step 332. At step 334, the TRS 216 can then determine if a transaction record should be compiled to store the transaction record for a master user. If the master user desires that a transaction record be stored, the TRS 216 can compile and store a transaction record for the master user, as shown at step 336. At step 338, the service call to the TRS 216 ends. The report can be sent based on the user's preferences or the master user's preferences.

Figure 4:
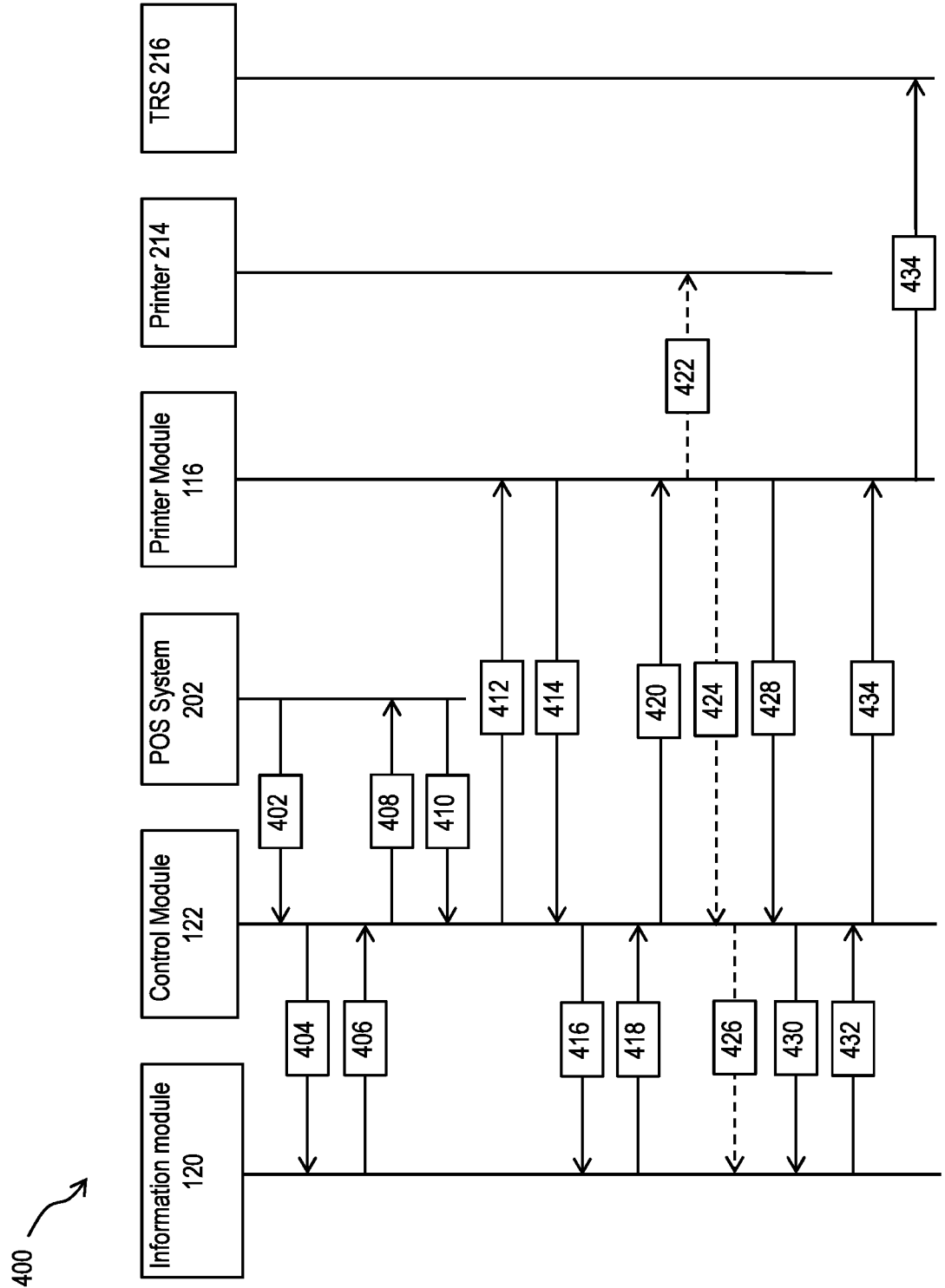
FIG. 4 is a diagram of one embodiment of data flow corresponding to the process shown in FIGS. 3A and 3B.

FIG. 4 shows a diagram 400 that illustrates exemplary data flow that can occur between the information module 120 (e.g., a magnetic strip card reader 126, a barcode and/or QR code scanner 128, and/or a NFC reader 130, the input module 132, and the microphone 133), the control module 122, the POS system 202, the printer module 116, the printer 214, and the TRS 216. In the illustrated embodiment, the POS system 202 can deliver a signal 402 to the control module 122 to indicate that fueling is complete. The signal 402 can also include a command for the control module 122 to prompt the user to accept or decline a transaction record. The control module 122 can deliver data 404 to the information module 120 to prompt the user to accept or decline a transaction record. For example, the control module 122 can deliver a signal to the display 124 to update the GUI rendered on the display to prompt the user to accept or decline delivery of a transaction record. The information module 120 can receive input data 406 from the user via, e.g., the buttons 125, the display 124, the input module, etc. and can send the data 406 to the control module 122. If the user accepts delivery of the transaction record, the control module 122 can deliver data 408 to the POS system 202 to request delivery of transaction data. The POS system 202 can deliver data 410 characterizing transaction data to the control module 122. As described above, the transaction data can include fueling data, payment information, user information, and/or user preferences.

The control module 122 can receive the data 410, format the data 410 and deliver data 412 characterizing the formatted data to the printer module 116. The printer module 116 can receive the data 412 and can deliver a signal 414 to the control module 122 to prompt the user to select options to receive a printed transaction record and/or an electronic transaction record. The control module 122 can deliver data 416 to the information module 120 to prompt the user to select an option to receive a printed transaction record and/or an electronic transaction record. For example, the control module 122 can deliver a signal to the display 124 to update the GUI to prompt the user to select an option to receive a printed transaction record and/or an electronic transaction record.

The user can then input data 418 to identify a desired type of transaction record, and the data 418 can be delivered to the control module 122. The control module 122 can deliver data 420 characterizing the desired type of transaction record to the printer module 116. If the user desires a printed transaction record, the printer module 116 can deliver record data 422 characterizing the formatted transaction data to the printer 214. The printer module 116 can deliver a signal 424 to the control module 122 to instruct the user to retrieve the printed transaction record. The control module 122 can deliver data 426 to the display 124 of the information module 120 to instruct the user to retrieve the printed transaction record. For example, the display 124 can instruct the user to retrieve the receipt from a remote location such as within a retail store on site, or a station area at the site where the fuel dispenser 100 is located.

If the user desires an electronic transaction record, the printer module 116 can deliver a signal 428 to the control module to prompt the user to supply contact information and/or supplemental information. The control module 122 can deliver data 430 to the display 124 of the information module 120 to prompt the user to enter contact information and/or supplemental information. As an example, supplemental information scan include an odometer reading, vehicle make, vehicle model, color, a license plate number, etc. The control module 122 can deliver data 430 to the display 124 of the information module 120 to instruct the user to retrieve the printed transaction record. The user can then input data 430 characterizing contact information and/or supplemental information, and the data 430 can be delivered to the control module 122. The control module 122 can deliver data 434 characterizing the contact information and/or supplemental information to the printer module 116. The printer module 116 can receive the data 434 and can combine the contact information and/or supplemental information with the formatted transaction data. The printer module 116 can deliver record data 436 characterizing the formatted transaction data, including the contact information and/or the supplemental information, to the TRS 216 such that a transaction record can be delivered to the user.

Figure 5:
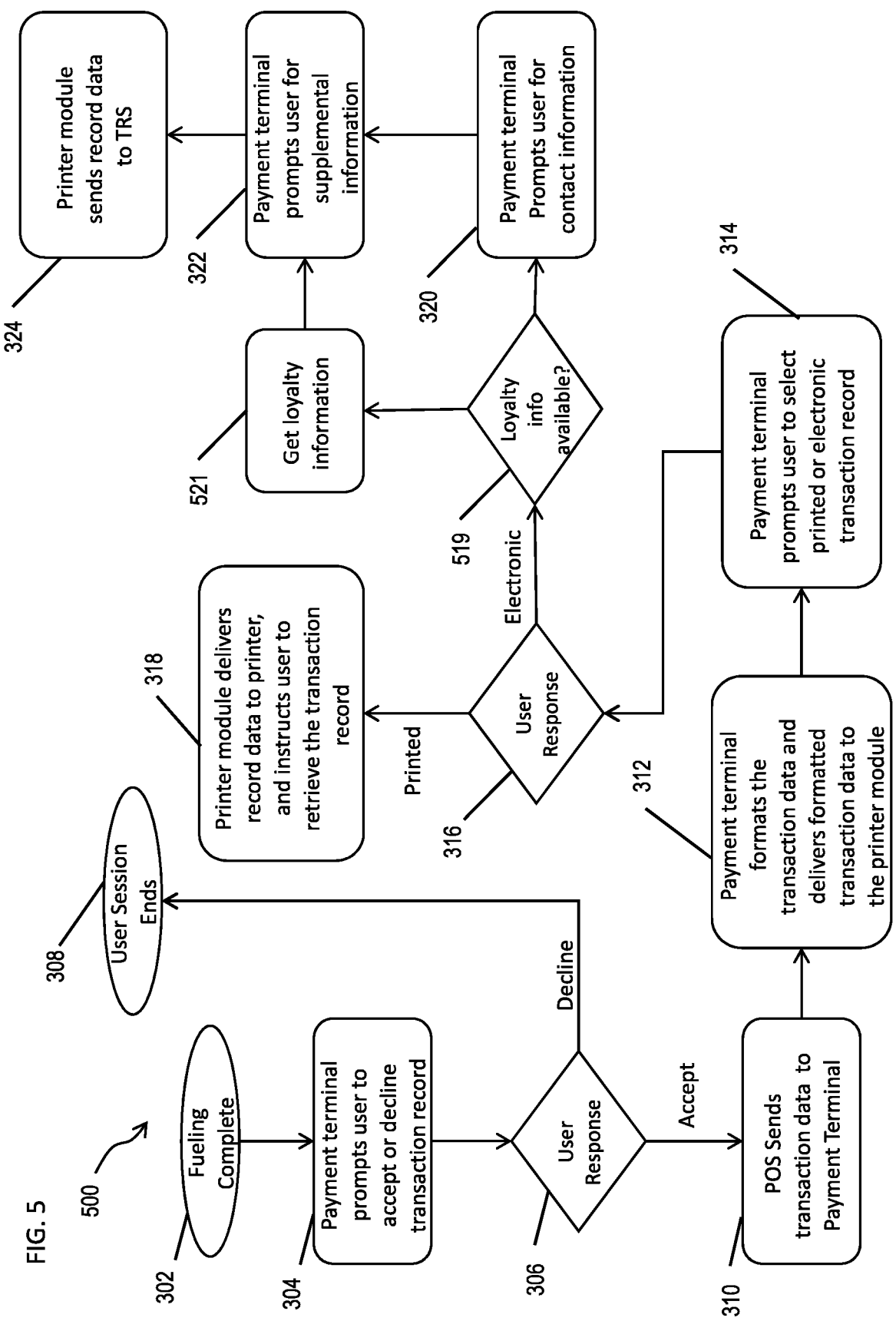
FIG. 5 is a flow diagram illustrating another embodiment of a process for providing a user with a transaction record.

FIG. 5 illustrates a portion of another exemplary process 500 for delivering a transaction record once fueling is complete. The process 500 can generally be similar to the process 300 shown in FIG. 3A, but in this case the payment terminal can prompt the user to enter loyalty program information if the user desire a transaction record. As shown in FIG. 5, if the user selects an electronic transaction record at step 316, the payment terminal can prompt the user to enter loyalty program information, if available, as shown at step 519. As an example, the user can scan a loyalty program card using scanner 128 can scan a loyalty program card to provide a loyalty identifier. The payment terminal can then use the loyalty identifier to get loyalty program information that corresponds to the user. For example, at step 521, the loyalty identifier can be used to obtain user information such as, e.g., contact information, user preferences, and/or a pre-set payment method, as described above with regard to FIG. 2. If the user is not part of a relevant loyalty program, the payment terminal can request contact information such as, e.g., email address and/or a phone number, as shown at step 320. The payment terminal can prompt the user for supplemental information and deliver record data to the TRS 216 in steps 322 and 324, as describe above with regard to FIG. 3A. The TRS 216 can process the data as described above with regard to the portion of the process 300 shown in FIG. 3B. In some embodiments, the record data can be transmitted immediately to the user. For example, the record data can be delivered to the user via text message to create the transaction record. As another example, the record data can be delivered to a mobile device of the user via NFC or Bluetooth communication.

Figure 6:
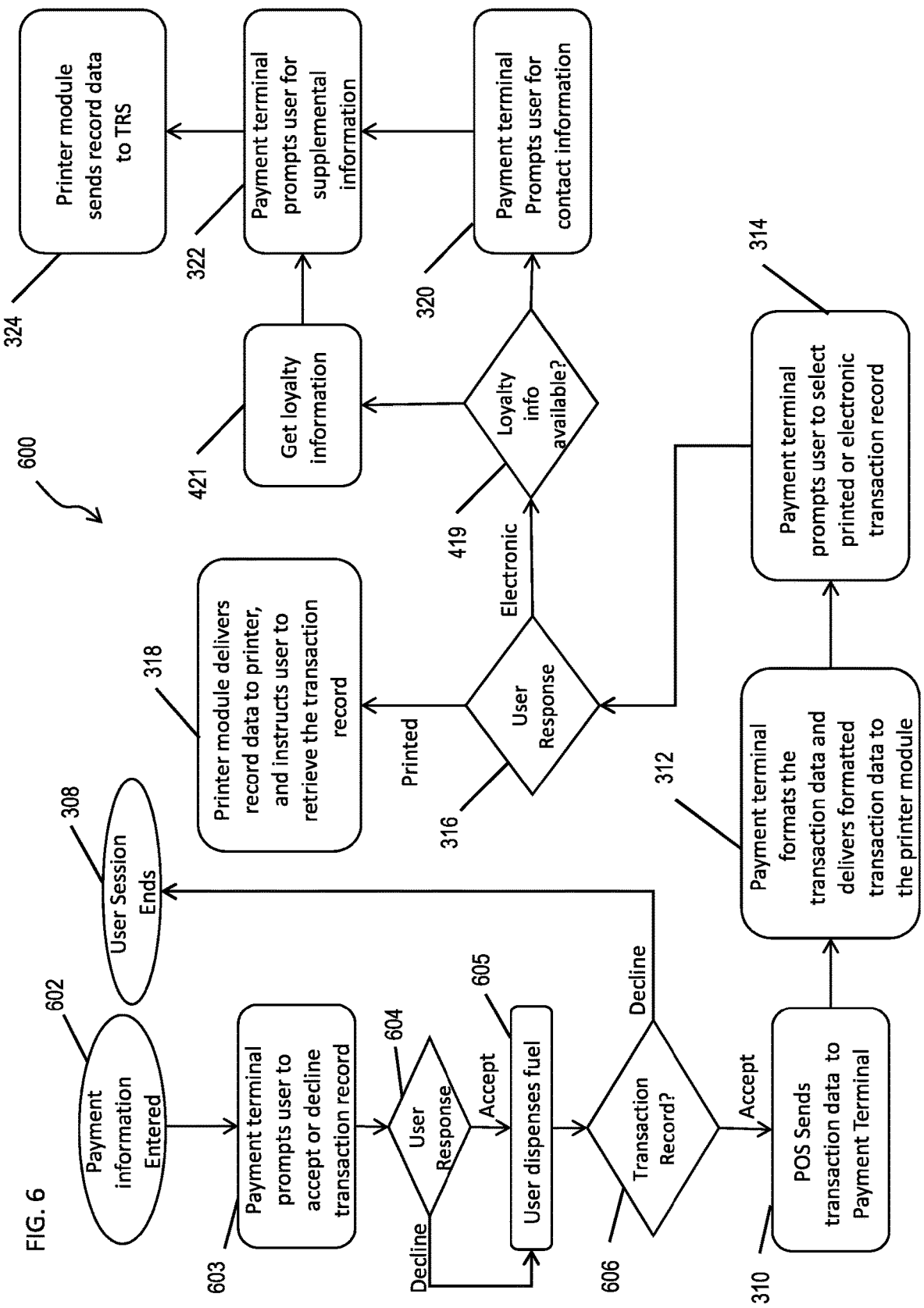
FIG. 6 is a flow diagram illustrating another embodiment of a process for providing a user with a transaction record.

FIG. 6 illustrates a portion of another exemplary process 600 for delivering a transaction record. The process 600 can generally be similar to the process 300 shown in FIG. 3A, but in this case the payment terminal can prompt the user accept or decline receiving a transaction record prior to fueling. As shown in FIG. 6, the user can enter payment information at step 602. At step 603 the payment terminal 110 can prompt the user (e.g., via the display 124) to accept or decline receiving a transaction record. At step 604, the user can input data to specify whether a delivery of a transaction record is desired. The user can then dispense fuel, as shown by step 605. The payment terminal can determine if the user desired delivery of a transaction record at step 606. If the user declines receiving a transaction record the user session ends, as shown in step 308. If the user has accepted receiving the transaction record, the POS system 202 can send the transaction data to the payment terminal 110, as indicate at step 310. The process 600 can continue as described above with regard to the processes 300, 500 shown in FIGS. 3A, 3B and 5.

Figure 7:
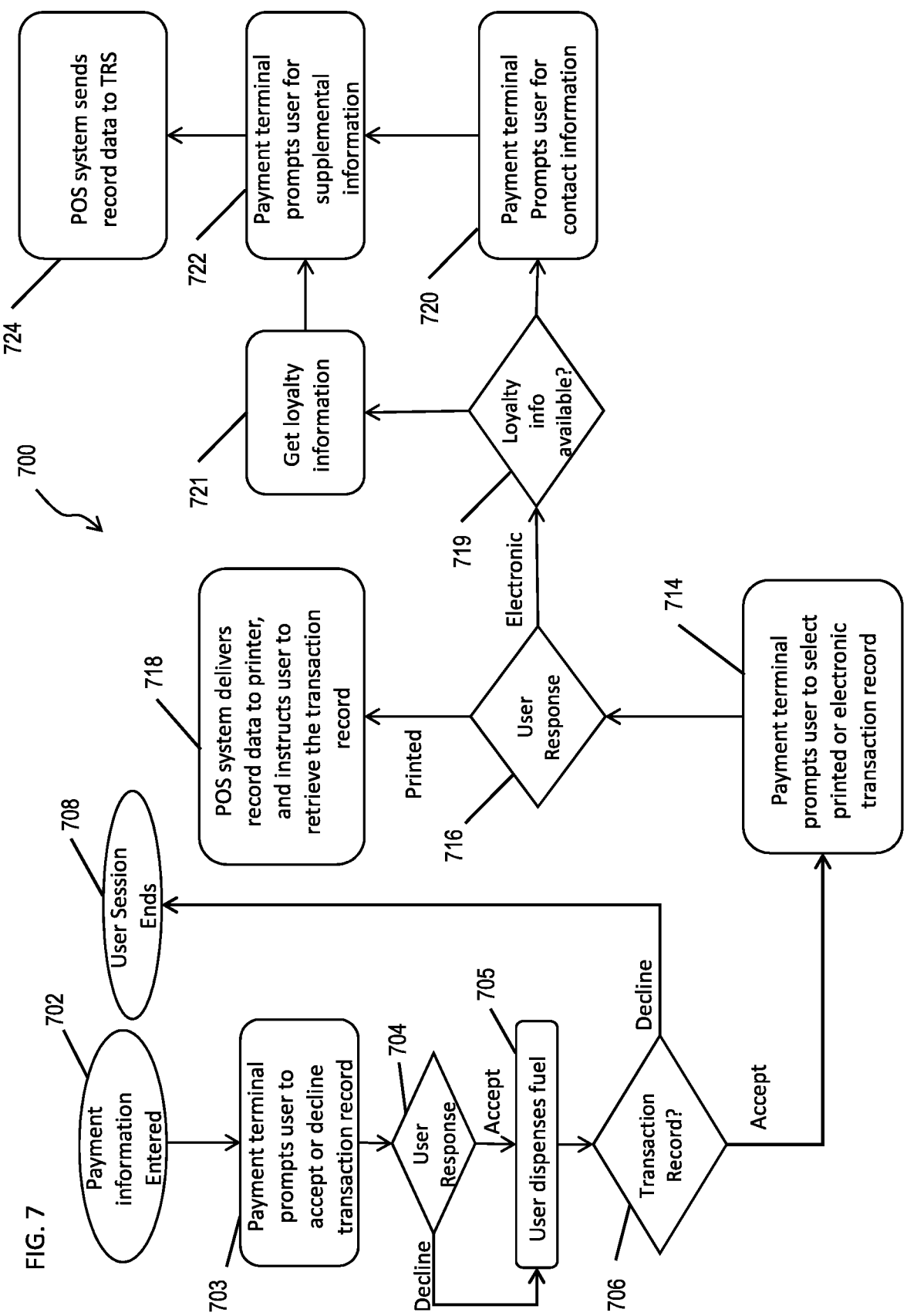
FIG. 7 is a flow diagram illustrating yet another embodiment of a process for providing a user with a transaction record.

FIG. 7 illustrates a portion process 700 for delivering a transaction record to a user, where record data is transmitted from a POS system rather than from a printer module of a fuel dispenser. As shown in FIG. 7, the user can enter payment information at step 702 at a payment terminal of the fuel dispenser. At step 703 the payment terminal can prompt the user (e.g., via a display such as the display 124 shown in FIG. 2) to accept or decline receiving a transaction record. The user can input data to accept or decline a transaction record, as shown by step 704. The user can then dispense fuel, as shown by step 705. The payment terminal can determine if the user desired delivery of a transaction record at step 706. If the user declines receiving a transaction record the user session ends, as shown in step 708.

At step 714, if the user has accepted a transaction record, the payment terminal can prompt the user to select an option to receive printed transaction record or an option to receive electronic transaction record. At step 716, the user can input data to select a printed transaction record and/or an electronic transaction record. The payment terminal can deliver data characterizing the desire type of transaction record to the POS system. If the user selects a printed transaction record, the POS system can deliver record data characterizing the formatted transaction data to a printer that can be similar to the printer 214 shown in FIG. 2, to create the printed transaction record, as shown in step 718. If the user selects an electronic transaction record at step 716, the payment terminal can prompt the user to enter loyalty program information, if available, as shown at step 719. As an example, the user can scan a loyalty program card using a scanner to can scan a loyalty program card to provide a loyalty identifier. The scanner can generally be similar to the scanner 128 shown in FIG. 2. The payment terminal 110 can then use the loyalty identifier to get loyalty program information that corresponds to the user. For example, at step 721, the loyalty identifier can be used to obtain user information such as, e.g., contact information, user preferences, and/or a pre-set payment method, as described above with regard to FIG. 2. As shown in step 720, the payment terminal can prompt the user to input user information (e.g., contact information such as an email address and/or telephone number) such that the electronic transaction record can be delivered to the user. At step 322, the payment terminal can prompt the user for supplemental information such as, e.g., an odometer reading, vehicle make, vehicle model, color, a license plate number, etc. Data characterizing the supplemental information and the user information can be delivered to the POS system to be included with the transaction data. As shown in step 724, the printer module 116 can send record data characterizing the transaction data to a TRS. The TRS can process the data as described above with regard to the portion of the process 300 shown in FIG. 3B. In some embodiments, the record data can be transmitted immediately to the user. For example, the record data can be delivered to the user via text message to create the transaction record. As another example, the record data can be delivered to a mobile device of the user via NFC or Bluetooth communication.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A fuel dispenser, comprising:
a pump housing having at least one fuel pump disposed therein and configured to dispense fuel;
an electronics housing having housed therein
a fuel controller operatively connected to a pump compartment for controlling the dispensing of fuel from the pump compartment,
a payment terminal having a control module configured to receive transaction data that characterizes a user transaction involving the dispensing of fuel from the pump compartment, format the transaction data to create the formatted transaction data, and to
transmit the formatted transaction data,
a printer module in electronic communication with the control module, the printer module being configured to receive the formatted transaction data from the control module, deliver a command to the control module to prompt a user to select a type of transaction record, receive data from the control module characterizing a selected type of transaction record, and to transmit record data that characterizes the formatted transaction data to a remote server configured to use data characterizing the user transaction involving the dispensing of fuel from the pump compartment to generate an electronic transaction record; and
a communication module configured to facilitate electronic delivery of the data characterizing the user transaction involving the dispensing of fuel from the pump compartment from the printer module to the remote server.

2. The fuel dispenser of claim 1, further comprising an information module configured to receive user information that identifies a user and transmits the user identification information to the control module.

3. The fuel dispenser of claim 1, wherein the printer module is configured to deliver the record data to a transaction record service on the remote server, the transaction record service being configured to create, store, and transmit a transaction record that characterizes the record data.

4. The fuel dispenser of claim 1, wherein the communication module is configured to facilitate electronic communication between the printer module and a mobile device using near field communication.

5. The fuel dispenser of claim 1, wherein the communication module is configured to facilitate electronic communication between the printer module and a mobile device using wireless communication.

6. The fuel dispenser of claim 1, wherein the printer module is configured to transmit the record data to the remote server using an email address provided by the user.

7. The fuel dispenser of claim 1, further comprising an information module disposed in the payment terminal of the fuel dispenser, the information module configured to receive a selection of a paper transaction record or the electronic transaction record characterizing the user transaction involving the dispensing of fuel from the pump compartment.

8. The fuel dispenser of claim 7, wherein when the electronic transaction record is selected via the information module disposed in the payment terminal of the fuel dispenser, the communication module is configured to facilitate the electronic delivery of data characterizing the user transaction involving the dispensing of fuel from the pump compartment from the printer module to the remote server.

9. The fuel dispenser of claim 1, wherein the communication module is further configured to facilitate electronic delivery of the data characterizing the user transaction involving the dispensing of fuel from the pump compartment from the printer module directly to a mobile device.

10. A device for transmitting transaction records from a fuel dispenser, comprising:
a printer module configured to
receive user information characterizing an identity of a user,
receive formatted transaction data from a control module within a payment terminal of the fuel dispenser, the formatted transaction data characterizing a user transaction involving dispensing of fuel from the fuel dispenser,
deliver a command to the control module to prompt the user to provide contact information, and
transmit, via a communication module of the fuel dispenser, record data characterizing the user transaction involving the dispensing of fuel from the fuel dispenser, the contact information, and the user information to a remote server configured to use the record data characterizing the user transaction involving the dispensing of fuel from the fuel dispenser to generate an electronic transaction record.

11. The device of claim 10, wherein the printer module is configured to deliver the record data to a transaction record service on the remote server, the transaction record service being configured to create, store, and transmit a transaction record that characterizes the record data.

12. The device of claim 10, wherein the printer module is configured to transmit the record data to a mobile device using wireless communication.

13. A method for processing a transaction at a fuel dispenser, comprising:
receiving user information that characterizes an identity of a user at a payment terminal of a fuel dispenser;
receiving transaction data from the payment terminal, the transaction data characterizing a user transaction involving the dispensing of fuel from the fuel dispenser;
receiving data that characterizes a type of record of the transaction as an electronic transaction record;
formatting the transaction data to create formatted transaction data;
generating record data characterizing the user transaction involving the dispensing of fuel from the fuel dispenser;
transmitting, from a printer module of the payment terminal, a command to a control module of the payment terminal to prompt the user to provide contact information; and
transmitting, via a communication module of the fuel dispenser, the record data characterizing the user transaction involving the dispensing of fuel from the fuel dispenser the user information, and the contact information to a remote server configured to use the record data characterizing the user transaction involving the dispensing of fuel from the fuel dispenser to generate the electronic transaction record.

14. The method of claim 13, further comprising displaying a prompt for the user to enter data that characterizes the desired type of record of the transaction.

15. The method of claim 13, wherein at least one of the receiving, formatting, generating, determining, and transmitting is performed by at least one data processor forming part of at least one computing system.

16. The method of claim 13, wherein the record data is transmitted to a printer at a remote location, the printer being configured to print a receipt, thereby generating a transaction record that characterizes the user transaction.

17. The method of claim 16, further comprising displaying instructions to instruct a user to retrieve the transaction record at the remote location.

18. The method of claim 13, wherein the record data is transmitted to a transaction records service that is configured to create, store, and transmit a transaction record that characterizes the record data.

19. The method of claim 13, wherein the record data is transmitted to a mobile device using wireless communication.

20. A non-transitory computer program product comprising computer readable instructions, which, when executed by at least one data processor forming part of at least one computing system, implement operations comprising:
receiving identification data that characterizes an identity of a user;
receiving transaction data from a payment terminal of a fuel dispenser, the transaction data characterizing a user transaction involving the dispensing of fuel from the fuel dispenser;
receiving data characterizing a type of record of the transaction as an electronic transaction record;
formatting the transaction data to create formatted transaction data;
generating record data characterizing the user transaction involving the dispensing of fuel from the fuel dispenser;
transmitting, from a printer module of the payment terminal, a command to a control module of the payment terminal to prompt the user to provide contact information; and
transmitting, via a communication module of the fuel dispenser, the record data characterizing the user transaction involving the dispensing of fuel from the fuel dispenser the identification information, and the contact information to a remote server configured to use the record data characterizing the user transaction involving the dispensing of fuel from the fuel dispenser to generate the electronic transaction record.

21. The non-transitory computer program product of claim 20, the operations comprising displaying a prompt for the user to enter data that characterizes the desired type of record of the transaction.

22. The non-transitory computer program product of claim 20, wherein at least one of the receiving, formatting, and transmitting is performed by at least one data processor forming part of at least one computing system.

23. The non-transitory computer program product of claim 20, wherein the record data is transmitted to a printer at a remote location, the printer being configured to print a receipt, thereby generating a transaction record that characterizes a user transaction.

24. The non-transitory computer program product of claim 23, further comprising displaying instructions to instruct a user to retrieve a transaction record at the remote location.

25. The non-transitory computer program product of claim 20, wherein the record data is transmitted to a transaction records service that is configured to create, store, and transmit a transaction record that characterizes the record data.

* * * * *